Patented Feb. 16, 1954

2,669,583

UNITED STATES PATENT OFFICE 2,669,583

4-AMINO-2-ALKOXYBENZAMIDES AND THEIR PREPARATION

Raymond O. Clinton, North Greenbush, and Stanley C. Laskowski, Menands, N. Y., assignors to Sterling Drug Inc., New York, N. Y., a corporation of Delaware No Drawing. Application March 10, 1951, Serial No. 215,005

12 Claims. (Cl. 260—559)

This invention relates to 4-amino-2-alkoxybenzamides and to their preparation. More particularly, the compounds of our invention are those having the general formula

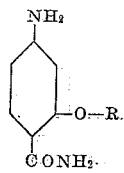

where R is a lower alkyl radical having from two to six carbon atoms, inclusive. These amides are pharmacologically active and possess analgesic properties.

The lower alkyl radical, designated above as R, is illustrated by radicals such as ethyl, n-propyl, n-butyl, isobutyl, n-amyl, isoamyl, n-hexyl, 2,3-dimethyl-n-butyl, and the like.

The amides of our invention are conveniently prepared from 4-nitro-2-(lower alkoxy)benzoic acids [disclosed in our copending U. S. Patent Applications Serial Nos. 168,843 and 168,844, filed June 17, 1950] as illustrated by the following reactions where R is defined as above:

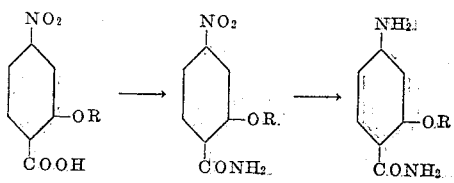

Thus, a 4-nitro-2-(lower alkoxy)benzoic acid is first converted into the corresponding 4-nitro amide by heating it with a halogenating agent, preferably thionyl chloride, to form the corresponding acid halide, which is then treated with ammonia. Alternatively, conversion of the 4-nitro acid to the corresponding amide can be carried out by first preparing a lower alkyl ester and then treating the ester with ammonia. The nitro group of the 4-nitro-2-(lower alkoxy)benzamide is then reduced to yield the corresponding 4-amino-2-(lower alkoxy)benzamide. A specific illustration of these reactions is the formation of 4-amino-2-ethoxybenzamide by treating 4-nitro-2-ethoxybenzoic acid with thionyl chloride to form the corresponding acid chloride, which upon amination with ammonia yields 4-nitro-2-ethoxybenzamide. Subsequent reduction of the 4-nitro amide yields 4-amino-2-ethoxybenzamide.

The reduction of the 4-nitro-2-(lower alkoxy)-benzamides to the corresponding 4-amino compounds was carried out by reacting said nitro compounds with reducing agents effective to reduce nitro groups to amino groups. This was carried out both by chemical methods and by catalytic hydrogenation. Suitable chemical reducing agents include iron and hydrochloric acid, ferrous sulfate and ammonia, tin and hydrochloric acid, sodium hydrosulfite, etc. In practicing our invention, we preferably used iron and hydrochloric acid. Catalysts suitable when catalytic hydrogenation is used include Raney nickel, platinum, palladium or other catalysts generally effective to catalyze hydrogenation of nitro groups to amino groups.

An alternative, but less preferred, mode of preparing the intermediate 4-nitro-2-(lower alkoxy)benzamides is afforded by partial hydrolysis of the corresponding 4-nitro-2-(lower alkoxy)-benzonitriles, e. g., conversion of 4-nitro-2-n-butoxybenzonitrile to 4-nitro-2-n-butoxybenzamide.

Specific embodiments of our invention are illustrated in the following paragraphs.

EXAMPLE 1

A. *4-nitro-2-(lower alkoxy)benzonitriles*

A mixture of 16.4 g. of 4-nitro-2-hydroxybenzonitrile and 14.0 g. of anhydrous potassium carbonate in 500 ml. of dry xylene was refluxed with a continuous separator attached to the reaction flask until the mixture was free of water. To this anhydrous mixture was added 48.2 g. of ethyl paratoluenesulfonate and the resulting mixture was refluxed for twelve hours, cooled and filtered. The solvent was removed by distilling under reduced pressure, thereby yielding a golden-brown solid which was taken up in ethyl acetate. The ethyl acetate solution was decolorized with activated carbon, concentrated, cooled and diluted with n-pentane. The solid that separated was filtered, washed with n-pentane and recrystallized from methanol to yield 4-nitro-2-ethoxybenzonitrile, M. P. 151.5–152.4° C. (cor.).

Analysis.—Calcd. for $C_9H_8N_2O_3$: C, 56.25; H, 4.20; N, 14.58. Found: C, 56.37; H, 4.07; N, 14.79.

When the above procedure was followed, but using the appropriate lower alkyl para-toluenesulfonate in place of ethyl para-toluenesulfonate, other 4-nitro-2-alkoxybenzonitriles were formed. Thus, 4-nitro-2-n-propoxybenzonitrile, M. P. 104.2–105.0° C. (cor.), was obtained from n-propyl paratoluenesulfonate and 4-nitro-2-hydroxybenzonitrile; and 4-nitro-2-n-butoxybenzonitrile, M. P. 101.8–102.7° C. (cor.), resulted from the reaction of n-butyl para-toluenesulfonate with 4-nitro-2-hydroxybenzonitrile.

B. 4-nitro-2-(lower alkoxy)benzamides

These compounds were prepared from the corresponding 4-nitro-(lower alkoxy)benzoic acids by amination of either the acid halide, preferably the chloride, or the lower alkyl ester derivatives thereof. Alternatively, they were prepared by partial hydrolysis of the corresponding 4-nitro-2-(lower alkoxy)benzonitriles. These modes of preparation are illustrated as follows in the formation of 4-nitro-2-ethoxybenzamide.

*From acid chloride.*—To a hot stirred mixture of 84.4 g. of 4-nitro-2-ethoxybenzoic acid, 32.4 g. of dry pyridine and 700 ml. of dry benzene was added dropwise 48.7 g. of thionyl chloride, at a rate such as to maintain gentle refluxing (the application of heat was necessary to maintain reflux near the end of the addition). Stirring and refluxing were continued for another twenty to thirty minutes. The cooled reaction mixture was poured slowly into two liters of concentrated ammonium hydroxide with efficient stirring (there was a delayed exothermic reaction). Stirring was continued for an additional two hours, after which time the solid material was collected, washed with benzene and with water and dried, yielding 76 g. of material, M. P. 185–187° C. This product, 4-nitro-2-ethoxybenzamide, melted at 188.2–190.0° C. (cor.) when recrystallized from absolute ethanol.

Analysis.—Calcd. for $C_9H_{10}N_2O_4$: C, 51.42; H, 4.80; N, 13.09. Found: C, 51.29; H, 4.68; N, 13.33.

*From ester.*—A solution of 20.0 g. of ethyl 4-nitro-2-ethoxyzenzoate in 50 ml. of methanol was treated with 14.0 g. of liquid ammonia and 6.0 ml. of a 2½ per cent solution of sodium in methanol. The mixture was heated in an autoclave for twenty-four hours at 100° C. and cooled. The crude 4-nitro-2-ethoxybenzamide, which was isolated by removing the methanol and ammonia by distillation in vacuo, was purified as above by recrystallization from absolute ethanol.

Alternatively, and preferably, this amination was combined with the subsequent reduction of the 4-nitro compound to yield the corresponding 4-amino compound (see Example 1C) without isolating and purifying the former compound. Thus, after the heat treatment in the autoclave for twenty-four hours and the cooling of the reaction mixture, as shown above, Raney nickel catalyst was introduced and the resulting mixture was then agitated with hydrogen under pressure. The reaction mixture was filtered and decolorized with activated carbon. The solvent was removed by distilling in vacuo, thereby yielding 10.5 g. of the crude product which solidified on cooling. This product, 4-amino-2-ethoxybenzamide, melted at 191.6–193.1° C. (cor.) when recrystallized from absolute ethanol.

*From nitriles.*—A mixture of 32 g. of 4-nitro-2-ethoxybenzonitrile and 100 ml. of concentrated sulfuric acid (95.5%, $d=1.84$) was heated with stirring on a steam bath. When the internal temperature had risen to 97° C., the steam bath was removed. An exothermic reaction ensued, whereupon the internal temperature rose to 109° C. After the exothermic reaction had subsided, the steam bath was replaced and heating was resumed for one hour. The hot reaction mixture was poured onto ice and the yellow solid that separated was filtered, washed well with water, and dried at 80° C. in vacuo, resulting in 30 g. of material melting at 150–160° C. after softening at 143° C. This material was recrystallized several times from absolute ethanol, with decolorization using activated carbon, yielding 4-nitro-2-ethoxybenzamide, M. P. 188.2–190° C. (cor.).

When the foregoing procedures were followed, but using the appropriate 4-nitro-2-(lower alkoxy)benzoic acids, the related 4-nitro-2-(lower alkoxy)benzamides of Table I resulted:

TABLE I

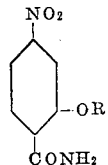

| R | M. P., ° C. (cor.) | Formula | Nitrogen Analyses | |
|---|---|---|---|---|
| | | | Calcd. | Found |
| $CH_2CH_2CH_3$ | 191.0–191.7 | $C_{10}H_{12}N_2O_4$ | 12.49 | 12.23 |
| $CH_2CH(CH_3)_2$ | 198.4–199.4 | $C_{11}H_{14}N_2O_4$ | 11.76 | 11.68 |
| $CH_2CH_2CH_2CH_3$ | 166.6–167.6 | $C_{11}H_{14}N_2O_4$ | 11.76 | 11.76 |
| $CH_2CH_2CH_2CH_2CH_2CH_3$ | 136.3–138.0 | $C_{13}H_{18}N_2O_4$ | 10.52 | 10.34 |

Additional 4-nitro-2-alkoxybenzamides can be prepared when the above procedures are followed, but using the appropriate 4-nitro-2-(lower alkoxy)benzoic acids. Thus, 4-nitro-2-n-amoxybenzamide is prepared from 4-nitro-2-n-amoxybenzoic acid; 4-nitro-2-isoamoxybenzamide from 4-nitro-2-isoamoxybenzoic acid; 4-nitro-2-(2,3-dimethyl-n-butoxy)benzamide from 4-nitro-2-(2,3-dimethyl-n-butoxy)benzoic acid; 4-nitro-2-(2-ethyl-n-butoxy)benzamide from 4-nitro-2-(2-ethyl-n-butoxy)benzoic acid; 4-nitro-2-isohexoxybenzamide from 4-nitro-2-isohexoxybenzoic acid; and the like.

C. 4-amino-2-ethoxybenzamide

A stirred mixture of 115 g. of powdered iron (ferrum reductum), 600 ml. of ethanol, 150 ml. of water and 1 ml. of concentrated hydrochloric acid was brought to a gentle boil. The heat source was removed and there was added 72 g. of 4-nitro-2-ethoxybenzamide in small portions at such a rate as to maintain gentle boiling. The mixture was then stirred just below the boiling point for thirty minutes, after which time there was added an excess of sodium bicarbonate (about 40 g.) and stirring and heating were continued for an additional ten minutes. The mixture was filtered while hot and the filter-cake was washed well with absolute ethanol. The ethanol was removed from the combined filtrates in vacuo and the residual solid was collected, washed with water and dried. There was thus obtained 58.5 g. of 4-amino-2-ethoxybenzamide, M. P. 190–192° C. A sample of this material, when recrystallized from ethanol, melted at 191.6–193.1° C. (cor.).

Analysis.—Calcd. for $C_9H_{12}N_2O_2$: C, 59.98; H, 6.71; N, 15.51. Found: C, 60.28; H, 6.58; N, 15.56.

Additional compounds can be prepared when the above procedure is followed, but using the appropriate 4-nitro-2-(lower alkoxy)benzamide. Thus, 4-amino-2-n-amoxybenzamide is obtained from 4-nitro-2-n-amoxybenzamide; 4-amino-2-isoamoxybenzamide from 4-nitro-2-isoamoxybenzamide; 4-amino-2-(2,3-dimethyl-n-butoxy)-benzamide from 4-nitro-2-(2,3-dimethyl-n-butoxy)benzamide; 4-amino-2-(2-ethyl-n-butoxy)benzamide from 4-nitro-2-(2-ethyl-n-butoxy)benzamide; 4-amino-2-isohexoxybenzamide from 4-nitro-2-isohexoxybenzamide; and the like.

EXAMPLE 2

*4-amino-2-n-propoxybenzamide*

When the procedure described above for Example 1C was followed, but using 43.5 g. of powdered iron, 200 ml. of ethanol, 50 ml. of water, 1 ml. of concentrated hydrochloric acid and 29.0 g. of 4-nitro-2-n-propoxybenzamide, there was obtained 23 g. of 4-amino-2-n-propoxybenzamide, which melted at 159.6–160.8° C. (cor.) after recrystallization from ethanol.

Analysis.—Calcd. for $C_{10}H_{14}N_2O_2$: C, 61.83; H, 7.26; N, 14.43. Found: C, 62.13; H, 7.39; N, 14.32.

EXAMPLE 3

*4-amino-2-n-butoxybenzamide*

When the procedure described above for Example 1C was followed, but using 61.6 g. of powdered iron, 200 ml. of ethanol, 50 ml. of water, 1 ml. of concentrated hydrochloric acid and 27.0 g. of 4-nitro-2-n-butoxybenzamide, there was obtained 22.7 g. of 4-amino-2-n-butoxybenzamide, which melted at 178.7–180.2° C. (cor.) after recrystallization from ethanol.

Analysis.—Calcd. for $C_{11}H_{16}N_2O_2$: C, 63.44; H, 7.75; N, 13.45. Found: C, 63.62; H, 7.49; N, 13.53.

EXAMPLE 4

*4-amino-2-isobutoxybenzamide*

This preparation was carried out according to the procedure described above for Example 1C, but using 21.2 g. of powdered iron, 200 ml. of ethanol, 50 ml. of water, 1 ml. of concentrated hydrochloric acid and 15.0 g. of 4-nitro-2-isobutoxybenzamide; there was thus obtained 13.0 g. of 4-amino-2-isobutoxybenzamide, which melted at 175.7–177.3° C. (cor.) after recrystallization from absolute ethanol.

Analysis.—Calcd. for $C_{11}H_{16}N_2O_2$: C, 63.44; H, 7.55; N, 13.45. Found: C, 63.47; H, 7.47; N, 13.12.

Alternatively, the above reduction of 4-nitro-2-isobutoxybenzamide was carried out catalytically as follows: A mixture of 10 g. of 4-nitro-2-isobutoxybenzamide, 0.5 g. of platinum oxide and 150 ml. of absolute ethanol was shaken with hydrogen at fifty lbs. per square inch and 50° C. until three moles of hydrogen were taken up. The mixture was filtered while hot and the filtrate upon concentration and slow dilution with water gave a quantitative yield of 4-amino-2-isobutoxybenzamide. The same results were obtained when a palladium catalyst was substituted for platinum oxide. Similarly, Raney nickel can be used in place of platinum oxide, but with about one hundred lbs. per square inch pressure of hydrogen at 100° C.

EXAMPLE 5

*4-amino-2-n-hexoxybenzamide*

This amide was prepared according to the procedure described above for Example 1C, but using the following reactants: 17.7 g. of powdered iron, 200 ml. of ethanol, 50 ml. of water, 1 ml. of concentrated hydrochloric acid and 14.0 g. of 4-nitro-2-n-hexoxybenzamide; there was thus obtained 12.0 g. of 4-amino-2-n-hexoxybenzamide, which melted at 127.6–129.0° C. cor.) after recrystallization from absolute ethanol.

Analysis.—Calcd. for $C_{13}H_{20}N_2O_2$: C, 66.07; H, 8.53; N, 11.86. Found: C, 66.09; H, 8.75; N, 11.78.

We claim:

1. An amide having the formula

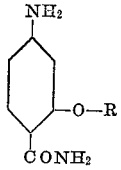

where R is a lower alkyl radical having from two to six carbon atoms.

2. 4-amino-2-ethoxybenzamide.
3. 4-amino-2-isobutoxybenzamide.
4. A process for the preparation of an amide having the formula

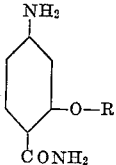

where R is a lower alkyl radical having from two to six carbon atoms, which comprises reacting the corresponding 4-nitro-2-alkoxybenzamide with a reducing agent effective to reduce nitro groups to amino groups.

5. A process for the preparation of 4-amino-2-ethoxybenzamide which comprises reacting 4-nitro-2-ethoxybenzamide with a reducing agent effective to reduce nitro groups to amino groups.

6. A process for the preparation of 4-amino-2-isobutoxybenzamide which comprises reacting 4-nitro-2-isobutoxybenzamide with a reducing agent effective to reduce nitro groups to amino groups.

7. 4-amino-2-n-propoxybenzamide.
8. 4-amino-2-n-butoxybenzamide.
9. 4-amino-2-n-hexoxybenzamide.

10. A process for the preparation of 4-amino-2-n-propoxybenzamide which comprises reacting 4-nitro-2-n-propoxybenzamide with a reducing agent effective to reduce nitro groups to amino groups.

11. A process for the preparation of 4-amino-2-n-butoxybenzamide which comprises reacting 4-nitro-2-n-butoxybenzamide with a reducing agent effective to reduce nitro groups to amino groups.

12. A process for the preparation of 4-amino-2-n-hexoxybenzamide which comprises reacting 4-nitro-2-n-hexoxybenzamide with a reducing agent effective to reduce nitro groups to amino groups.

RAYMOND O. CLINTON.
STANLEY C. LASKOWSKI.

References Cited in the file of this patent

UNITED STATES PATENTS

| Number | Name | Date |
|---|---|---|
| 2,044,016 | Perkins | June 16, 1936 |
| 2,490,780 | Clinton | Dec. 13, 1949 |

OTHER REFERENCES

Goldstein et al.: "Helv. Chem. Acta," vol. 32, (1949), pp. 2331–3.

Blanksma: "Rec. Trav. Chim.," vol. 66, (1947), pp. 365–373.

Jensen et al.: "Acta Chemica Scandinavica," vol. 2, (1948), pp. 220–4.